United States Patent
von Obstfelder

[15] 3,693,441
[45] Sept. 26, 1972

[54] FLUID STREAM SENSING DEVICE

[72] Inventor: Heinz-Jurgen von Obstfelder, Speldorf Birkenstr. 15, 433 Mulheim/Ruhr, Germany

[22] Filed: Oct. 26, 1970

[21] Appl. No.: 84,043

[30] Foreign Application Priority Data

Nov. 4, 1969 Germany..........P 19 55 280.8

[52] U.S. Cl.......................................73/208, 73/323
[51] Int. Cl.................................................G01f 1/00
[58] Field of Search ..73/208, 209, 323, 401; 29/455, 29/463

[56] References Cited

UNITED STATES PATENTS

| | | |
|---|---|---|
| 1,450,611 | 4/1923 | Schroeder....................73/208 |
| 3,208,284 | 9/1965 | Rivero..........................73/401 |
| 3,436,500 | 4/1969 | Culbert.........................73/401 |
| 2,130,981 | 9/1938 | Fischer et al..................73/209 |
| 2,003,474 | 6/1935 | Schweitzer....................73/208 |
| 3,141,331 | 7/1964 | Wilson..........................73/209 |

Primary Examiner—James J. Gill
Assistant Examiner—Herbert Goldstein
Attorney—Ernest F. Marmorek

[57] ABSTRACT

A fluid stream sensing device has a casing and therein a transparent measuring tube and within the same a sensing body arranged to be floated by incoming fluid stream and lifted by same to a level being representative of the parameters of said stream to be measured. The tube is provided with a series of compensating openings on a line parallel to the longitudinal tube axis, and the tube is composed of easily assemblable shells.

4 Claims, 5 Drawing Figures

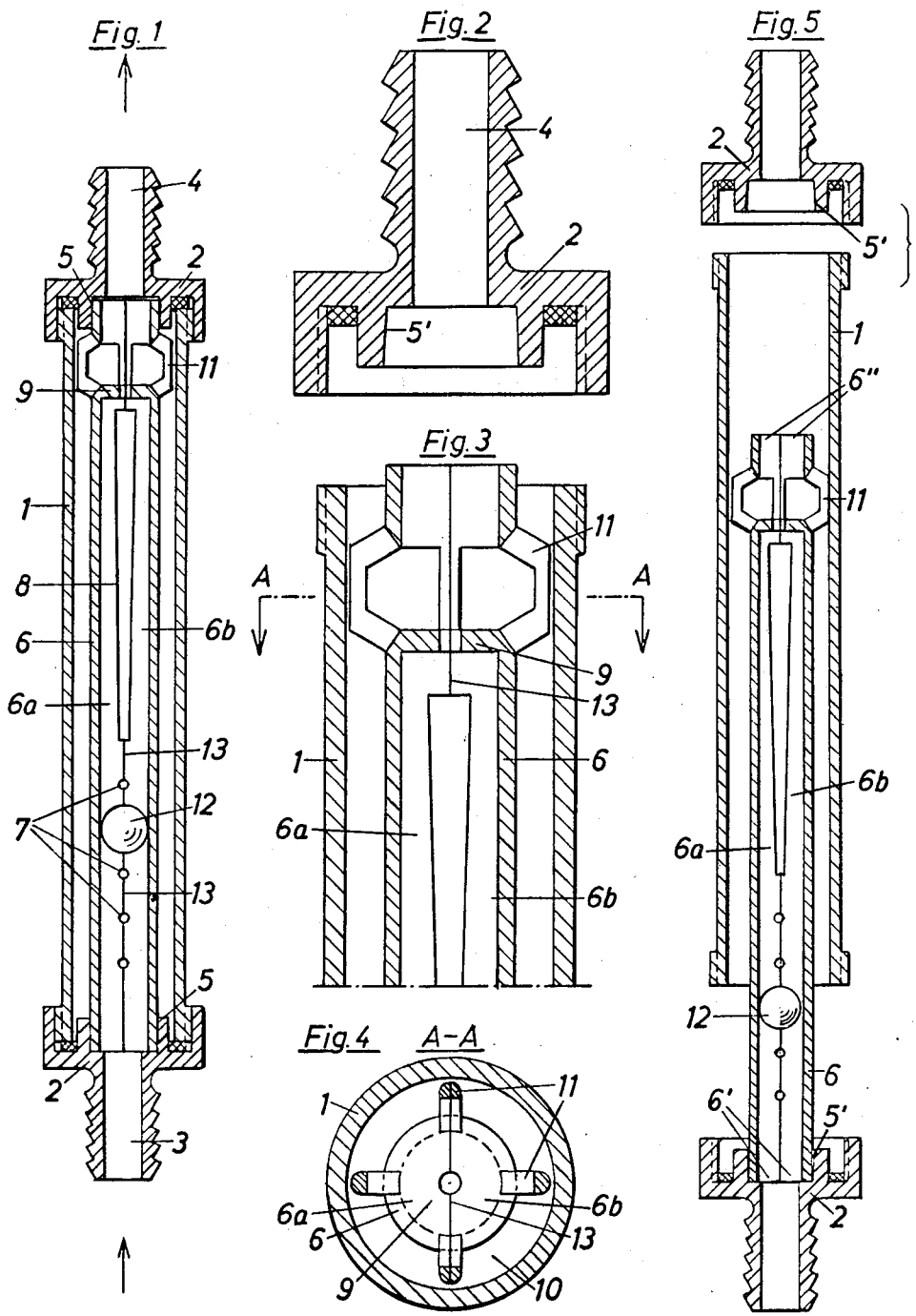

FLUID STREAM SENSING DEVICE

BACKGROUND OF THE INVENTION

The invention relates to a device serviceable for sensing the fluid flow intensity by a sensing body floatable within a transparent measuring tube by an incoming fluid stream. The float levels reached are indicative of said stream characteristics. Said sensing body is heavier than the fluid to be tested. A series of regularly spaced outflow openings is provided in said tube on a line parallel to its longitudinal axis. In response to the fluid flow parameters, said sensing body, in being lifted, frees a number of said outflow openings compensating the fluid pressure and allowing the fluid to flow through the annular space between said measuring tube and said casing outside.

It is well known in this art to provide measuring floating bodies preferably shaped as balls, because this shape allows the body to slide conveniently within a measuring and sensing tube of the apparatus. This shape effectively prevents the settling of impurity sediments upon the ball. (See German Pat. No. 1,180,890).

Sensing and measuring tubes have been known which are inserted within opposite holding arrangements which exert axial and elastic pressure upon said tubes for maintaining them in position and assembled also under the impact of the fluid stream. In some corresponding mechanisms, these holding arrangements serve contemporarily for attaching fluid influx and/or discharge conduits to the device casing. (See German Pat. No. 1,202,513). According to this prior art arrangement, the inventions comprise holding means that provide influx and discharge conduits, and the measuring and sensing tube is provided in its upper portion with a partition wall and has its top space arranged to serve as an outlet or discharge.

For obtaining fluid stream testing and/or sensing devices of this kind with an inner measuring and sensing tube of this type, a lot of work needs to be spent on the manufacture of all the assemblage components of the measuring and sensing tube. This is particularly due to the need of providing in said tubes appropriate openings, either holes or slots, being points of the measuring scale. These openings have been prepared by way of drilling and other outer surface operations. A further problem arises with regard to these devices where a partition wall is mounted in said tubes.

Furthermore, in said known devices the cleaning of said tubes from layers of soiling particles is difficult, especially where the tubes are narrow.

SUMMARY OF THE INVENTION:

It is accordingly among the objects of this invention to improve the above mentioned fluid sensing devices by provision of a transparent measuring and sensing tube lightly assemblable from longitudinal molded shells. Said tube is housed in a transparent tubular casing carrying terminal closing caps with external peripherally ridged extensions for attachment of influx and/or discharge conduit hoses. Within said casing, between these extensions, there is axially aligned and mounted on the measuring and sensing tube that has a similar diameter than the casing, and the tube is provided with lateral openings. In the upper region of the casing, said tube carries a partition wall. In the lower portion of said measuring and sensing tube a floating body is slidably arranged. This body is lifted to higher positions in response to the flow of the incoming fluid and opens, in moving upwardly, a number of said openings. The height reached by said sensing floating body is indicative of said fluid flow parameters.

Another object of the invention is to overcome the above mentioned drawbacks of the devices of this kind of the prior art.

A further object of this invention is to provide a fluid stream sensing device including components, such as the measuring and sensing tube, the casing and the terminal caps, which can be manufactured easily yet with great precision, can be cleaned without difficulty, and is simple to dismount and to reassemble.

Still another object of the invention is to provide a fluid flow sensing device that has an outer transparent cylindrical casing, an internal, preferably transparent, measuring and sensing tube with a series of discharge openings disposed along the device axis, and inside this measuring and sensing tube a sliding body heavier than the fluid to be sensed. The body frees, in being floated by the incoming fluid stream, a number of said discharge openings commensurate to the pressure and intensity of streaming velocity of the fluid stream measured, which number is representative of said values. In this sensing device said casing is affixed to, and said longitudinal shells that form the measuring and sensing tube are held in position by, one top and one bottom cap, then assembled.

Further objects and advantages of the invention will be set forth in part in the following specification and in part will be obvious therefrom without being specifically referred to, the same being realized and attained as pointed out in the claims hereof.

Within these objects, and for this purpose, the invention broadly provides said measuring and sensing device as a combination of at least two shells composing said tube on an axial middle plane of same. Said shells are prepared in a procedure requiring no machine-tooling, for instance, by pressing, drawing, or injection molding. These shells have preferably semi-circular cross section. They correspond to each other symmetrically regarding the discharge openings and also regarding the partition wall, they interlock within themselves. The end portions of said shells are attached to, and meet each other in, corresponding bores provided in the closing and assembling terminal caps. These caps connect and close the casing and said measuring and sensing tube, and have outside hollow and outwardly ridged extensions for the connection thereto of influx and discharge conduit hoses.

The said shells are combined to form said measuring and sensing tube. They may be made already with the discharge openings and the intermediate wall. Their production may be by casting or by a simple other forming process. They can be prepared by way of pressing or extraction from a flat strap of material, or by injection molding for example of a suitable plastic material.

In assembling the device, it is generally sufficient to have said shells held and compressed together within corresponding cylindrical bores provided in said terminal caps of the device. For specific reasons, in another embodiment of the invention, said shells may be additionally cemented together on the surfaces on which they contact each other.

It is within the purview of this invention to provide terminal caps capable of receiving and compressing together the shells. In these caps certain sections, such as internal bores are conical in shape. The inner bore surface of said caps making contact with the assembled shells press the shells one against the other to adhere mutually and free from leaks.

In a preferred embodiment of the invention, the components are readily mountable together to compose the device according to the invention. Their assembling is a quick and simple operation. First, the internal measuring and testing tube provided in its upper portion with said partition is prepared. It has regularly peripherally distributed cams around the walls of said shells extending sidewardly toward the inner surface of the tubular casing. This measuring and testing tube can be readily introduced into said casing.

BRIEF DESCRIPTION OF THE DRAWING

The construction of the device according to the invention, the effect of said cams and other involved characteristics of the invention are explained in more detailed examples of the invention, in connection with the accompanying drawings, wherein:

FIG. 1 is a partial longitudinal sectional view of the completely assembled device according to the invention;

FIG. 2 is a large scale vertical sectional view of the invention in which the central bore has a slightly conical shape;

FIG. 3 is a large scale longitudinal sectional view of the upper portion of the device according to the invention taken on the level of the intermediate wall attached to the vertically inserted measuring and sensing tube;

FIG. 4 is a horizontal sectional view taken on the line A—A of FIG. 3, and

FIG. 5 is an extended sectional view of the device according to the invention, in the process of being assembled.

DESCRIPTION OF THE PREFERRED EMBODIMENT

The invention comprises a cylindrical casing 1 made of a transparent material. Closing terminal caps 2 are in threaded engagement on the end portion of the casing 1. These terminal caps 2 continue outside in tubular ridged extensions serving for attachment of discharge and/or influx hoses (not shown). The bottom extension defines an inlet bore 3 which serves for the influx and the upper extension defines a discharge bore 4 for the discharge of the fluid the streaming of which is to be sensed and/or measured by the device according to the invention.

In the interior of the casing 1 in assembled state, said terminal caps 2 are provided with tubular central bores 5 serving for receiving and accommodating in assembled condition the abutting shells of the measuring and sensing tube 6. The tube 6 has a diameter smaller than said casing 1. This measuring and sensing tube 6 is sidewardly provided with discharge openings 7 and above same with a tapering outlet slot 8.

Above the outlet slot 8, there is provided a partition wall 9 that closes the top of the tube 6, for separating the measuring and sensing section of the tube 6, from the upper space of the casing 1. Above said intermediate wall 9, outlet spaces are provided that communicate with the fluid discharge aperture 4. Adjacent these outlet spaces, the measuring and sensing tube is provided on its periphery with regularly and radially distributed centering projections 11 that extend closely towards the inner wall of the casing 1.

The tube 6 defines with the casing an annular space 10 that intercommunicates with the discharge bore 4, by way of the aforesaid outlet spaces of the casing 1 above said partition wall 9.

Said measuring and sensing tube 6 is composed of two shells or longitudinal tube sections 6a and 6b which combine to form said tube 6. The shells are provided with a series of symmetrically and regularly distributed discharge openings 7, with said outlet slot 8 and with said regularly peripherally distributed centering projections 11. These projections 11, together with the inner wall of the casing 1, delimit said outlet space. In the sensing and measuring region of said tube 6, a sliding floatable sensing body, such as a ball, 12 is arranged as shown in FIG. 1.

In FIG. 2 the bores 5' in the terminal cap 2 are shown as conical. They serve to move towards each other the shells when the device is assembled to form the tube 6. The shells make contact along contacting surfaces 13. The terminal caps 2 are tightly screwed upon said casing 1 and this screwing fixes in their positions all the components of the device according to the invention.

The semi-tubular shells that complete the measuring and sensing tube 6 may be injection-molded from a plastic material. During the respective process, also the discharge openings 7, the outlet slots 8, the projections 11 and the elements of the partition wall 9 are simultaneously cast. This provides for a greatly simplified fabrication and subsequent assembly.

The assemblage of the device according to the invention is performed in a manner apparent from FIG. 5. First, said semi-tubular shells are put together to form the tube 6, and the floating sensing body 12 is introduced between them. Thereafter, these combined shells are inserted on their lower terminal 6' into the central bore 5 (or 5') provided in the bottom terminal cap 2. Then the tube 6 is placed on the interior of the casing 1 together with its bottom terminal cap 2 and the latter threaded to the bottom portion of the casing 1. Then the top section of the measuring and sensing tube 6 with the projections 11 is duly positioned and centered within said casing 1. The top terminal cap 2 is then fully screwed upon the casing 1, so that this cap 2 automatically receives into, and embraces by its bore 5 (5') the top of said semi-tubular shells composing said measuring and sensing tube 6. The bores are preferably tapered, as shown at 5'. It is apparent that no specific tooling is necessary to be applied for assembling the device according to the invention.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a fluid stream sensing device of the type having a transparent tubular casing including apertured terminal caps for inflow and outflow, and inside said casing a transparent measuring and sensing tube defining with said casing an annular space in communication with said outflow, said tube having discharge openings intercommunicating between the interior of said tube and said annular space, a sensing body operable to be floated slidably arranged in said tube, the respective position of said sensing body in said tube corresponding to the prevailing parameters of said fluid stream, the improvement comprising said tube being disconnectably assembled of at least two adjoining longitudinal tube sections, said terminal caps including internal walls defining bores the end portions of said sections being surrounded and held in adjoining position by said bore walls.

2. The device of claim 1, wherein said bores in said terminal caps are tapered thereby positively pressing said end portions of said sections together in said adjoining position.

3. The device of claim 1, said sections being in contact with each other along predetermined contact surfaces, and an elongated discharge opening between said contact surfaces.

4. The device of claim 1, wherein said measuring and sensing tube is provided in its upper portion with a wall closing the top of said tube and with external peripherally distributed centering projections extending towards the inner wall of said casing and defining outlet spaces communicating with said annular space and said outflow.

* * * * *